United States Patent
Terao et al.

(10) Patent No.: US 6,510,289 B2
(45) Date of Patent: Jan. 21, 2003

(54) IMAGE FORMATION SYSTEM, CONTROL METHOD OF IMAGE FORMATION SYSTEM, IMAGE FORMATION APPARATUS AND STORAGE MEDIUM THEREOF

(75) Inventors: Yoshihide Terao, Kanagawa (JP); Kazuhiro Sakaguchi, Kanagawa (JP); Tetsuya Yokoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/875,964

(22) Filed: Jun. 8, 2001

(65) Prior Publication Data

US 2001/0051052 A1 Dec. 13, 2001

(30) Foreign Application Priority Data

Jun. 13, 2000 (JP) ........................................ 2000-176985

(51) Int. Cl.$^7$ .............................................. G03G 15/00
(52) U.S. Cl. ................................ 399/16; 399/8; 399/23; 399/82; 399/85
(58) Field of Search ................................ 399/8, 16, 23, 399/81, 82, 85, 361, 370, 376; 358/1.15

(56) References Cited

U.S. PATENT DOCUMENTS 6,078,759 A * 6/2000 Satake et al. ................... 399/8
6,122,457 A * 9/2000 Kizaki ......................... 399/82 X

FOREIGN PATENT DOCUMENTS

JP 2000-358127 * 12/2000

* cited by examiner

*Primary Examiner*—Sophia S. Chen
(74) *Attorney, Agent, or Firm*—Fitzpatrick, Cella, Harper & Scinto

(57) ABSTRACT

The present invention relates to an image formation system for forming images of read original images, a control method of the image formation system, image formation apparatuses, a storage medium thereof. According to the present invention, sheets of which size corresponds to an attribute of the images are selected, and it is detected whether or not the image formation apparatus has the sheets selected by the image formation apparatus. When it is detected that the image formation apparatus does not have the selected sheets, sheets other than the selected sized sheets are selected as sheets used in forming images by the image formation apparatus, and it is controlled that another image formation apparatus performs an image formation using the sheets other than the selected sized sheets.

29 Claims, 4 Drawing Sheets

IMAGE FORMATION SYSTEM, CONTROL METHOD OF IMAGE FORMATION SYSTEM, IMAGE FORMATION APPARATUS AND STORAGE MEDIUM THEREOF

BACKGROUND OF THE INVENTION

1. Field of the Invention

The present invention relates to an image formation system for forming images which were read, a control method of the image formation system, an image formation apparatus and a storage medium thereof.

2. Related Background Art

A digital complex apparatus which has plural functions such as a copying function, a printing function, an image scanning function, a fax function and the like comes to be utilized widely.

As one of operation modes in the digital complex apparatus, an operation mode used for selecting optimum sheet size for the purpose of performing a copying operation called an APS (Auto Paper Select) has been known. An operation performed in the digital complex apparatus according to the APS mode will be briefly explained. First, in a scanner device held by the digital complex apparatus, an original size detection sensor equipped in an automatic feeder or the scanner unit detects original size. Then, image size is determined according to the detected original size and a copying magnification. Further, the optimum sheet size is selected by selecting copying sheet size most suitable to the image size among the copying sheet sizes held by the digital complex apparatus. By selecting the optimum sheet size using the APS mode, the setting of sheet size, or the like can be easily performed by a user.

In recent years, it has been proposed an image formation system which achieves an operation mode called a cascade copy operation, in which plural digital complex apparatuses are connected to a network and a printing operation is performed from the digital complex apparatus (called a local equipment) for reading originals to the local equipment itself and the digital complex apparatus (called a remote equipment) other than the local equipment connected through the network. Productivity of the image formation system can be increased by performing the cascade copy operation.

In this image formation system, if the cascade copy operation mode is performed together with the above APS mode, it is considered that a work load of the user at the local equipment side and the remote equipment side can be decreased.

However, in the above image formation system, if a case of performing the cascade copy operation together with the APS mode is taken into consideration, there occurs a problem regarding sheet selection. For example, when optimum sized sheets selected at the local equipment side or the remote equipment side are not stored in a sheet feed stage, an output result not intended by the user such as a case of outputting images on different sized sheets between the local equipment side and the remote equipment side, or the like is obtained. As a result, there arises fears of occurring such a defectiveness showing a fact that data desired by the user can not be outputted.

SUMMARY OF THE INVENTION

The present invention is applied to solve the above problem, and an object is to provide an image formation system, a control method of the image formation system, image formation apparatuses and a storage medium thereof for preventing a problem of sheet selection may be occurred when the plural image formation apparatuses output images, and obtaining an output result desired by a user.

In order to achieve the above object, it is provided an image formation system which includes an image formation apparatus for forming an image which was read and another image formation apparatus capable of communicating with the image formation apparatus through a communication medium, wherein the image formation apparatus, comprising:

a first selection means for selecting a sheet of which size corresponds to an attribute of the image;

a first detection means for detecting whether or not the image formation apparatus has the sheet selected by the first selection means; and a second selection means for selecting a sheet other than the sheet of which size is selected by the first selection means as a sheet to be used in forming an image by the image formation apparatus in a case where it was detected that the image formation apparatus does not have the sheet by the first detection means, while, the another image formation apparatus comprising:

a control means for controlling the another image formation apparatus to perform an image formation using the sheet selected by the second selection means.

Another object of the present invention is to provide an image formation system, a control method of the image formation system and a storage medium thereof for obtaining a desired output result even if printing sheets can not be automatically selected when the plural image formation apparatuses output images.

In order to achieve the above object, it is provided an image formation system which includes an image formation apparatus for forming an image which was read and another image formation apparatus capable of communicating with the image formation apparatus through a communication medium, wherein the image formation apparatus, comprising:

a first selection means for selecting a sheet of which size corresponds to an attribute of the image; and a second selection means for selecting a sheet other than the sheet of which size is selected by the first selection means as a sheet to be used in forming an image by the image formation apparatus, wherein in case of forming images in the image formation apparatus and the another image formation apparatus, the sheet size held by the image formation apparatus is priorly selected on the basis of the selection according to the second selection means even in a case where the sheet size selected by the first selection means is not held by the image formation apparatus and is held by the another image formation apparatus.

Still another object of the present invention is to provide an image formation system, a control method of the image formation system, a local copying apparatus, a remote copying apparatus and a storage medium thereof for preventing difference in the printing sheets between the local equipment side and the remote equipment side which may occur by performing an APS operation when a cascade copy operation is performed, and obtaining a desired output result.

In order to achieve the above object, it is provided an image formation system which has a local copying apparatus having a first scanner unit for reading an original image, a first printer unit for printing the original image and a first sheet feed stage for feeding sheets used in printing performed by the first printer unit, and a remote copying apparatus having a second scanner unit for reading the original image, a second printer unit for printing the original image and a second sheet feed stage for feeding sheets used in printing performed by the second printer unit, can print the original image by the second printer unit by transmitting the original image which was read by the first scanner unit from the local copying apparatus to the remote copying apparatus through a predetermined network, wherein the local copying apparatus, comprising:

a first selection means for detecting size of the original image to be read by the first scanner unit and selecting sheet size to be used in printing the original image on the basis of the detected size;

a detection means for detecting whether or not sheets of which size was selected by the first selection means are stored in the first sheet feed stage;

a second selection means for selecting sheet size other than the sheet size selected by the first selection means as sheet size to be used in printing the original image by the first printer unit, in a case where it was detected that the sheets are not stored in the first sheet feed stage by the detection means; and a notification means for notifying the sheet size selected by the second selection means to the remote copying apparatus, while, the remote copying apparatus, comprising:

a control means for controlling the second printer unit to print the original image received from the local copying apparatus using the sheets of which size was notified by the notification means and they are stored in the second sheet feed stage.

The above and other objects of the present invention will become clear from the following description of embodiments.

DETAILED DESCRIPTION OF THE PREFERRED EMBODIMENTS

Hereinafter, the embodiment of the present invention will be explained with reference to the attached drawings.

Figure 1:
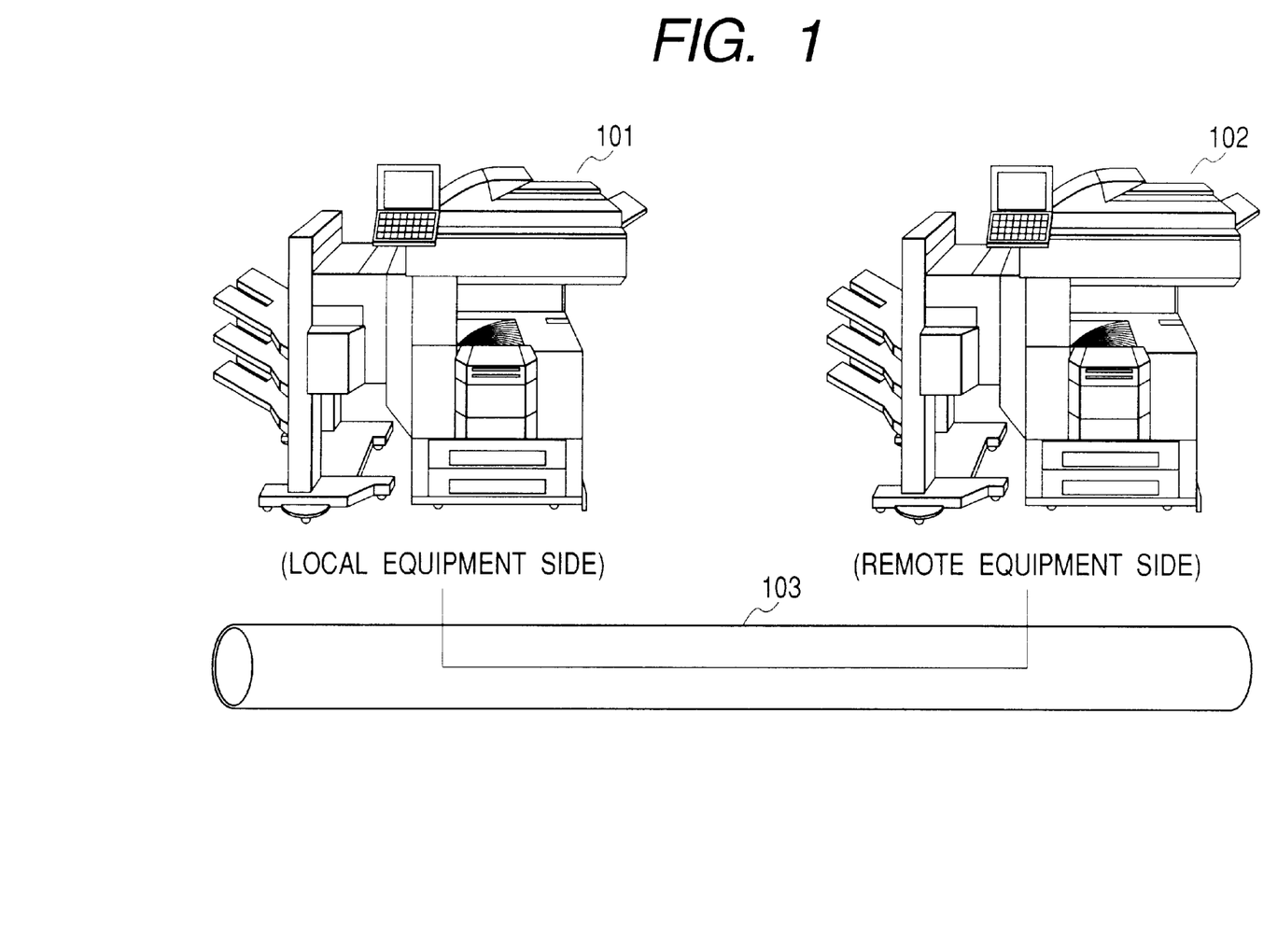
FIG. 1 is a conceptional diagram showing the hardware structure of an image formation system structured on a computer network in an embodiment of the present, invention.

FIG. 1 is a conceptional diagram showing the hardware structure of an image formation system structured on a computer network in the embodiment of the present invention.

A copying apparatus 101 is a digital complex apparatus having a copying function, a printing function, an image scanning function, a fax function and the like. It is assumed that a copying apparatus 102 is a digital complex apparatus which has the same functions as those of the copying apparatus 101. The copying apparatus 102 may be a different digital complex apparatus if it has functions of achieving an operation performed in the image formation system in the present embodiment.

The copying apparatuses 101 and 102 are connected to a computer network 103, through which equipment information, copying jobs and the like are transmitted and received. In the present embodiment, the copying apparatus 101 is used as a local equipment for reading originals, and the copying apparatus 102 is used as a remote equipment for outputting image data read by the copying apparatus 101 through the computer network 103.

Figure 2:
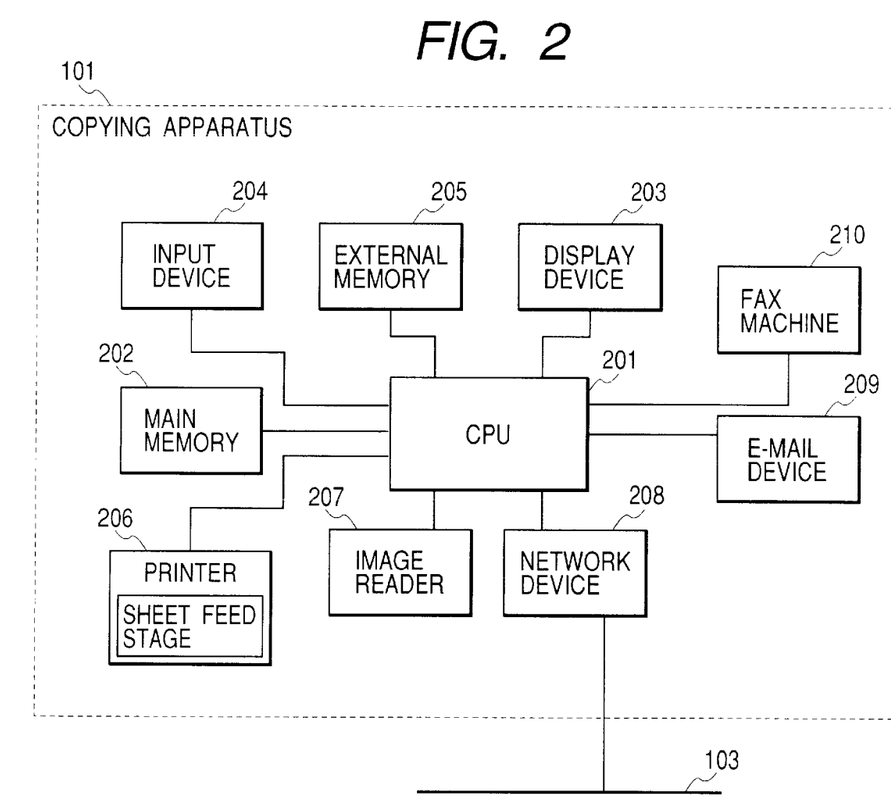
FIG. 2 is a block diagram showing the hardware structure of a copying apparatus 101 in the embodiment of the present invention.

FIG. 2 is a block diagram showing the hardware structure of a copying apparatus 101.

The main part of the copying apparatus 101 is structured by a CPU 201, a main memory 202, a display device 203, an input device 204, an external memory 205, a printer 206, an image reader 207, a network device 208, an E-mail device 209 and a fax machine 210.

The CPU 201 controls each of the devices 202 to 209 and the fax machine 210 structuring the copying apparatus 101, and performs calculation and logical calculation. In case of performing a cascade copy operation in the present image formation system, the CPU 201 further executes processing of the copying apparatus 101 as that of the local equipment. The main memory 202 structured by a storage medium such as a RAM, a ROM or the like stores information required when the present image formation system executes image formation processing, and the information can be read in accordance with necessity.

The display device 203 displays information related to a processing operation performed in the present image formation system and has a CRT, a liquid crystal display, a touchscreen (not shown) or the like. The touchscreen also functions as the input device 204. The input device 204 which performs various inputting operations to the CPU 201 can be a key board, a mouse, a card reader, a touchscreen (not shown) or the like. The touchscreen functions as the display device 203 also functions as an operation unit of the copying apparatus 101. A cascade copy operation command and sheet selection by a user can be performed by operating buttons or the like displayed on the touchscreen by an operator.

The external memory 205 which stores various information can be a magnetic memory, a magnetooptical memory or the like. The external memory 205 has a database or the like which holds notifying destination information for the trouble every occurrence frequency of the trouble.

The printer 206 is a printer unit of printing image data on a printing sheet such as a paper or the like. As a printing system, it can be any of an electrophotographic system using a photosensitive drum or a photosensitive belt, an ink jet system of directly printing an image on a sheet by ejecting ink from a microscopic nozzle array, and the like. Hereinafter, although sheets used for the print by the printer 206 are explained as printing sheets, it is needless to say that a case of using another printing sheets such as OHP sheets or the like are also applicable to the present invention.

The printer 206 has plural sheet feed stages such that different sized sheets such as A3 sized sheet, A4 sized sheet, B4 sized sheet and the like can be selected and has sheet cassettes (not shown) corresponding to each sheet size. In the each sheet cassette, a sensor for detecting whether or not the sheets to be set are stored in the cassette is provided, and a detected result obtained by the each sensor is transmitted to the CPU 201 and is used as sheet size information in case of performing the cascade copy operation and an APS operation.

The image reader 207 is composed of a scanner unit for reading originals and an automatic feeder (not shown) used for automatically reading plural sheets of originals. In the scanner unit, an image on a sheet being an original is illuminated and electronic information related to the original is obtained by operating a CCD line sensor. The image reader 207 also has an original size detection sensor to have an automatic detection function of original size on performing the APS operation.

The network device 208 which connects the copying apparatus being the present hardware to the computer network 103 inputs and outputs information. The E-mail device 209 performs transmission and reception operations of mails with an external equipment through the computer network 103. The fax machine 210 performs facsimile transmission and reception with the external equipment.

Figure 3:
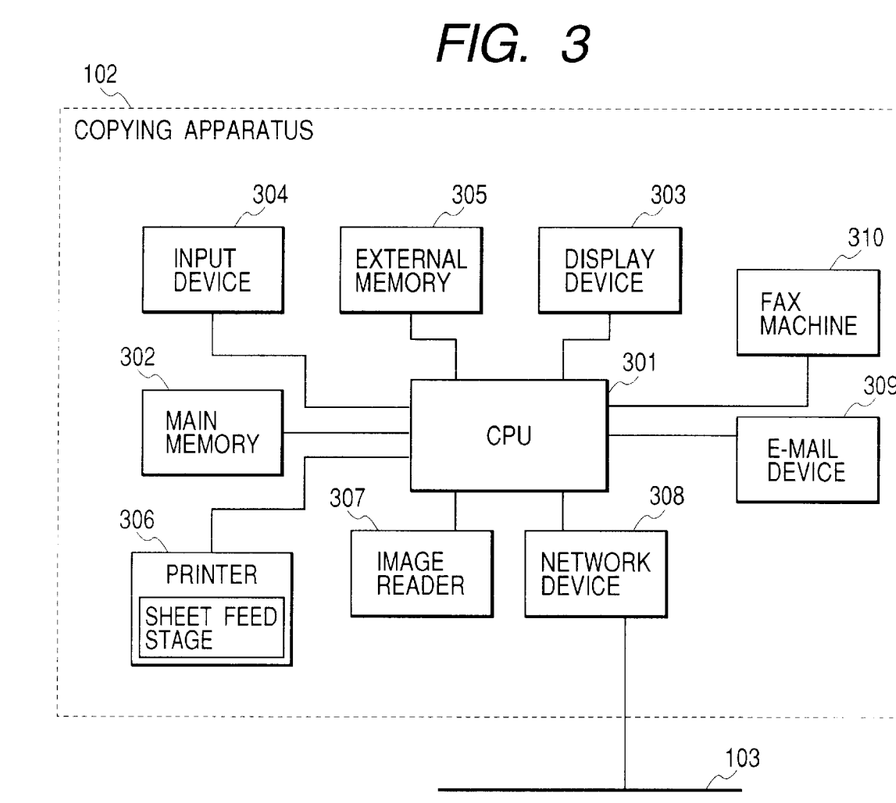
FIG. 3 is a block diagram showing the hardware structure of a copying apparatus 102 in the embodiment of the present invention.

FIG. 3 is a block diagram showing the hardware structure of the copying apparatus 102.

The main part of the copying apparatus 102 is structured by a CPU 301, a main memory 302, a display device 303, an input device 304, an external memory 305, a printer 306, an image reader 307, a network device 308, an E-mail device 309 and a fax machine 310. It is assumed that each of them has the same function as that of each of the CPU 201, the main memory 202, the display device 203, the input device 204, the external memory 205, the printer 206, the image reader 207, the network device 208, the E-mail device 209 and the fax machine 210 in the copying apparatus 101. However, the CPU 301 performs a control of processing to be executed in the copying apparatus 102 as the remote equipment in case of performing the cascade copy operation in the present image formation system.

The cascade copy operation performed in the image formation system in the present embodiment will be briefly explained. As mentioned above, among the plural copying apparatuses existing on the computer network 103, the cascade copy operation is performed by the two apparatuses by treating the copying apparatus 101 as the local equipment and the copying apparatus 102 as the remote equipment. Therefore, the originals are read by the image reader 207 in the copying apparatus 101 being the local equipment, and obtained image data is to be outputted by the printer 206 of the copying apparatus 101 itself being the local equipment and the printer 306 of the copying apparatus 102 being the remote equipment.

Setting of the cascade copy operation is performed on the touchscreen (not shown) provided in the copying apparatus 101 being the local equipment. On a screen of the touchscreen, setting similar to that in an ordinary copying operation such as the number of output copies, magnification or the like is performed. However, as to an output sheet setting screen, beside the output selection with ordinary sheets (A3, A4, B5 etc.), the screen is displayed so as to select an APS (Auto Paper Select) mode. By selecting the APS mode on the display screen, the cascade copy operation using the APS mode can be performed.

Upon issuing a print start command in the copying apparatus 101 after terminating the setting related to the cascade copy operation, the originals set on the image reader 207 are read and the APS operation is performed. Thereafter, each the number of copies automatically assigned or assigned by the setting of the user are respectively outputted by the printers of the copying apparatuses 101 and 102. In a case where the APS operation is normally performed in the image formation system, the images are outputted at the copying apparatuses 101 and 102 with optimum sheet size.

Next, the APS (Auto Paper Select) mode used in the present embodiment will be briefly explained. The APS mode is one of operation modes performed in the digital complex apparatus (the copying apparatus 101 or 102) so as to select the optimum sheet size in case of performing a copying operation. By selecting the optimum sheet size using the APS mode, setting of the sheet size or the like by the user can be easily performed.

In the present image formation system, first, an original size detection sensor provided on the automatic feeder or the scanner unit in the image reader 207 of the copying apparatus 101 detects size of the set original. Detected size information is transmitted to the CPU 201, and image size is determined according to the detected original size and a copying magnification. It should be noted that, in the present embodiment, the copying magnification is assumed to be direct or same (×1.00). Further, by selecting the sheet feed stage storing sheets of which size is most suitable to image size among the plural sheet feed stages of the copying apparatus 101, the optimum sheet size is selected. With respect to the copying apparatus 102, original size information determined by the CPU 201 in the copying apparatus 101 is transmitted to the copying apparatus 102 through the computer network 103, then by selecting the sheet feed stage storing sheets of which size is most suitable to the image size among the plural sheet feed stages of the copying apparatus 102, the optimum sheet size is selected. Accordingly, the cascade copy operation using the APS mode can be performed in the copying apparatus 101 (local equipment) and the copying apparatus 102 (remote equipment).

However, a state that the optimum sized sheets are not stored in the sheet feed stage may be occurred on using the APS mode. This state is called an APS error. If the APS error is occurred in the cascade copy operation in the present embodiment, there occurs a problem that the cascade copy operation is not correctly performed. For example, an outputting operation is performed by only the one apparatus or necessity of interrupting the cascade copy operation is occurred.

As a result, since unsatisfying feeling is to be given to the user, some measures should be taken for the APS error. If the APS error occurred, as a method of coping with the APS error, the optimum sized sheets are reset in the sheet feed stage, or another sheet size is selected from the display device at the local equipment side, whereby a copying operation is performed.

However, in the method of selecting another sheet size from the display device at the local equipment side, if the optimum sized sheets are stored at the remote equipment side, the corresponded optimum sheet size is selected regardless of the sheet size selected at the local equipment side. Therefore, images are copied with the sheet size other than the optimum sheet size at the local equipment side. On the other hand, the images are copied with the optimum sheet size at the remote equipment side. As a result, since there occurs difference in the sheet size used for outputting between these two equipments, the above method does not reach an effective method of coping with the APS error.

In the present embodiment, if the APS error occurs, not only another sheet size can be selected, but also coincidence in the sheet size can be achieved as explained below.

Figure 4:
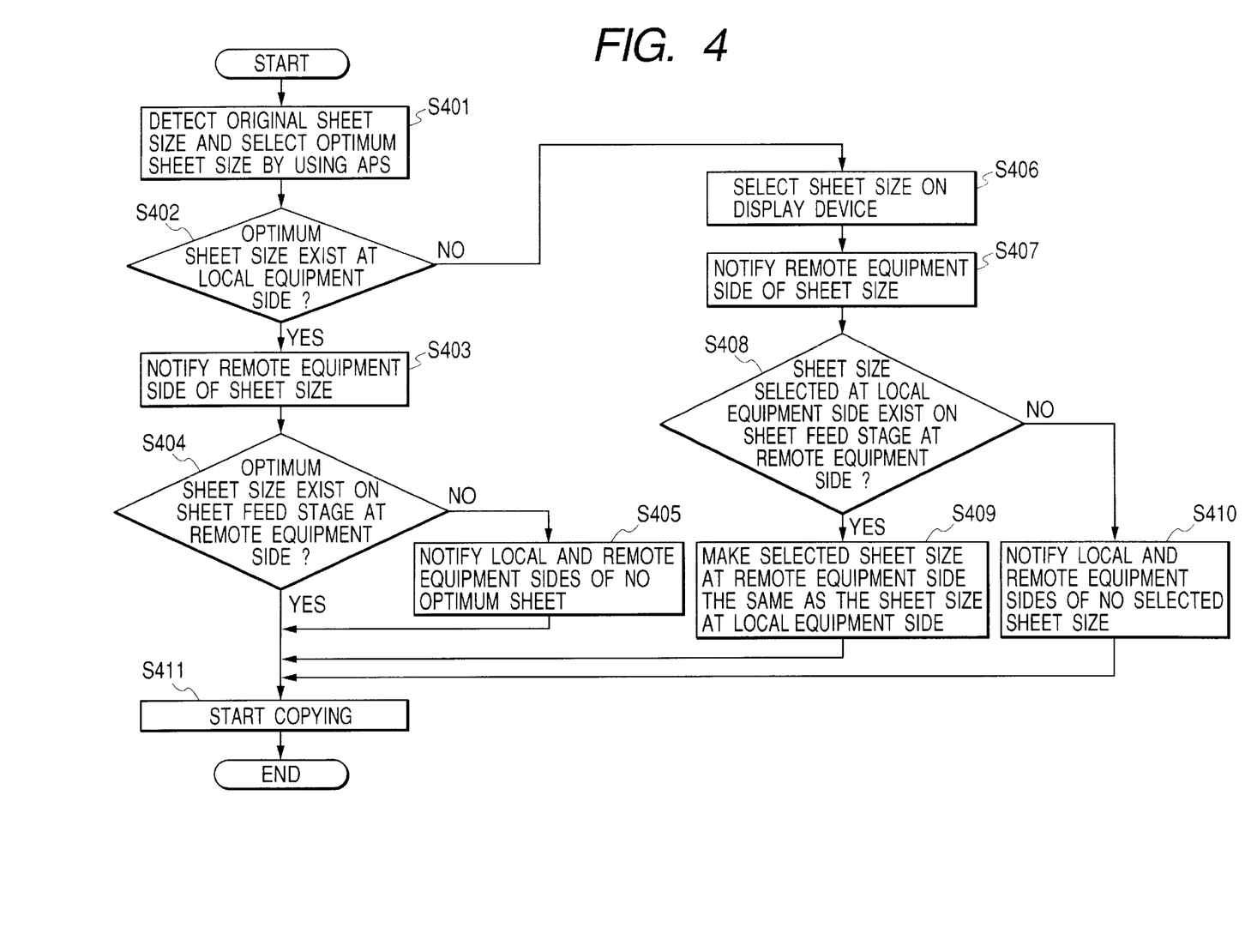
FIG. 4 is a flow chart for explaining an operation of the image formation system when a cascade copy operation using an APS mode is performed in the embodiment of the present invention.

In the present embodiment, an operation in the image formation system in case of performing the cascade copy operation using the APS mode will be explained with reference to a flow chart shown in FIG. 4. Reference numerals shown in FIG. 4 indicate each of steps. In processing indicated in the flow chart in FIG. 4, the CPU 201 controls processing to be executed in steps S401 to S403 and steps S406 and S407, and the CPU 301 controls processing to be executed in steps S404 and S405 and steps S408 to S411.

In the present embodiment, the copying apparatus 101 is assumed as the local equipment, and plural sheets or plural pages of originals are read from the copying apparatus 101 side, then obtained image data is transmitted to the copying apparatus 101 and the copying apparatus 102 being the remote equipment, whereby the cascade copy operation is performed.

First, the originals are read by the image reader 207 in the copying apparatus 101 being the local equipment, and the original size is automatically detected using the APS mode, then the optimum sheet size is selected (S401).

Next, it is detected whether or not the optimum sized sheets selected in the step S401 are stored in the sheet feed stage in the copying apparatus 101 (S402).

In the present embodiment, different processing is to be executed in accordance with a detected result obtained in the step S402. In the step S402, when the selected optimum sized sheets are stored in the sheet feed stage in the copying apparatus 101, an automatic sheet selection based on the APS mode is normally performed, and the present image formation system shifts its operation to an operation performed from the step S403 being an ordinary cascade copy operation. However, when the selected optimum sized sheets are not stored in the sheet feed stage in the copying apparatus 101, there comes into a state of the APS error, and the present image formation system shifts its operation to an operation performed in the step S406 being the cascade copy operation when the APS error is occurred.

First, in the step S402, a case where the optimum sized sheets are stored in the sheet feed stage in the copying apparatus 101 and the ordinary cascade copy operation is to be performed will be explained.

The optimum sheet size is notified to the copying apparatus 102 on the computer network through the network device 208 (S403).

At the copying apparatus 102 side, it is detected whether or not the optimum sized sheets notified from the copying apparatus 101 are set in the sheet feed stage in the printer 306 (S404).

As a result in the step S404, if the optimum sized sheets are set in the sheet feed stage in the printer 306, a copying operation is performed using the optimum sized sheets (S411).

In the step S404, when the optimum sized sheets are not set in the sheet feed stage in the printer 306, a fact that the optimum sized sheets are not stored in the sheet feed stage is notified to the copying apparatuses 101 and 102 (S405), and the copying operation is performed using the sheets, of which size is in the high priority order, previously set in the copying apparatus 102 (S411).

Next, a case being the feature of the present embodiment that the optimum sized sheets are not in the sheet feed stage in the copying apparatus 101, that is a case of occurring the APS error will be explained.

When the APS error occurs, a sheet selection screen (not shown) is displayed on the touchscreen of the display device 203. In accordance with a setting operation indicated in the sheet selection screen performed by the user, another sheet size displayed on the display screen is selected (S406).

Upon receiving a selection operation of the sheet size performed by the user on the touchscreen, the selected sheet size is notified to the copying apparatus 102 on the computer network through the network device 208 (S407).

The copying apparatus 102 detects whether or not the sheets of which size is notified from the copying apparatus 101 are stored in the sheet feed stage in the printer 306 at the copying apparatus 102 side (S408).

As a result in the step S408, if the notified sized sheets are stored in the sheet feed stage in the printer 306, the sheet size at the copying apparatus 102 side is set in the same size as that at the copying apparatus 101 side (S409), then the copying operation is started (S411).

As a result in the step S408, if the notified sized sheets are not stored in the sheet feed stage in the printer 306, a fact that the selected sized sheets are not stored in the sheet feed stage is notified to the copying apparatuses 102 and 101 (S410), and the copying operation is performed using the sheets, of which size is in the high priority order, previously set in the copying apparatus 102 (S411).

In the present embodiment, in the steps S404 and S408, even when the sheets of which size is notified from the copying apparatus 101 being the local equipment are not stored in the sheet feed stage of the copying apparatus 102 being the remote equipment, the copying operation is performed using the sheets, of which size is in the high priority order, previously set in the copying apparatus 102.

However, even in this case, there occurs the difference in the sheet size between the local equipment side and the remote equipment side. Therefore, in accordance with the user's preference, it may be controlled to terminate processing executed in the copying apparatus 102 being the remote equipment after issuing the notification to be notified in the steps S405 and S410. Processing at this time can be explained as one passing through copy start processing executed in the step S411 indicated in the flow chart in FIG. 4.

In the present embodiment, an explanation was given for a case where only the one copying apparatus is used as the remote equipment, however, the cascade copy operation in the present embodiment is applicable in a case where the cascade copy operation using plural remote equipments constituted by the same and different kinds of equipments is performed.

Further, in the present embodiment, it was assumed that the copying apparatus is structured to have the image reader and the printer, however the present invention is not limited to this case, and even in a case where the image reader and the printer individually exist on the network, the cascade copy operation in the present embodiment can be performed.

As explained above, according to the present embodiment, by constituting the image formation system of combining the cascade copy operation with the APS mode, an effect of escaping a complex operation such as sheet size setting performed by the user in performing the cascade copy operation, can be obtained.

When the APS error, that is, a state that the local equipment does not have the optimum sized sheets based on the APS mode occurred, since the sheet size set by the user at the local equipment side is notified to the remote equipment side such that the images can be outputted from the remote equipment side with the set sized sheets, the sheet size can be coincided with each other between the local equipment side and the remote equipment side. As a result, an effect that the images can be outputted without giving unsatisfying feeling to the user can be obtained.

It is needless to say that the present invention can be completed in a case where a storage medium storing the program codes of a software for achieving the functions of the above embodiment is supplied to a system or an apparatus an then a computer (or CPU or MPU) in the system or the apparatus reads and executes the program codes stored in the storage medium (e.g., the main memory 202 in the above embodiment).

In this case, the program codes themselves read from the storage medium achieve the functions of the embodiment, and the storage medium storing such the program codes constitute the present invention. The storage medium for supplying the program codes can be, for example, a floppy disk, a hard disk, an optical disk, a magnetooptical disk, a CD-ROM, a CD-R, a magnetic tape, a non-volatile memory card, a ROM or the like. It is needless to say that the present invention also includes not only a case where the functions of the above embodiment are achieved by the execution of the program codes read by the computer, but also a case where an OS or the like functioning on the computer executes all the process or a part thereof according to the instructions of the program codes, whereby the functions of the above embodiment is achieved.

Further, it is needless to say that the present invention includes a case where the program codes read from the storage medium are once stored in a memory provided in a function expansion board inserted in the computer or a function expansion unit connected to the computer, and a CPU or the like provided in the function expansion board or the function expansion unit executes all the process or a part thereof according to the instructions of the program codes, whereby the functions of the above embodiment is achieved.

As above, the present invention has been explained on the basis of the preferable embodiment. However, the present invention is not limited to the above embodiment, but may be modified in various manners within the scope of the following claims.

What is claimed is:

1. An image formation system which includes an image formation apparatus for forming an image which was read and another image formation apparatus capable of communicating with the image formation apparatus through a communication medium, wherein the image formation apparatus comprises:

first selection means for selecting a sheet of which size corresponds to an attribute of the image;

first detection means for detecting whether or not the image formation apparatus has the sheet selected by said first selection means; and second selection means for selecting a sheet other than the sheet of which size is selected by said first selection means as a sheet to be used in forming an image by the image formation apparatus in a case where it was detected that the image formation apparatus does not have the sheet by said first detection means, wherein the other image formation apparatus comprises: control means for controlling the other image formation apparatus to perform an image formation using the sheet selected by said second selection means.

2. A system according to claim 1, wherein said first selection means detects an original size read by the image formation apparatus and selects the sheet on the basis of the original size and a designated magnification.

3. A system according to claim 1, wherein said second selection means selects the sheet other than the sheet of which size was selected by said first selection means on the basis of a setting of a user.

4. A system according to claim 1, further comprising first notification means for notifying selection information according to said first selection means and said second selection means to the other image formation apparatus.

5. A system according to claim 4, further comprising second detection means for detecting whether or not the other image formation apparatus has a sheet of which size was notified by said first notification means.

6. A system according to claim 5, further comprising second notification means for notifying, in a case where it was detected that the sheet was not held by said second detection means, that fact to the image formation apparatus and the other image formation apparatus.

7. A system according to claim 6, wherein said control means controls to perform an image formation using a predetermined sheet of which size was previously set in the other image formation apparatus, in a case where it was detected that the sheet was not held by said second detection means.

8. A system according to claim 7, wherein said control means controls not to perform the image formation to terminate processing to be executed in the other image formation apparatus, in a case where it was detected that the sheet was not held by said second detection means.

9. A system according to claim 1, wherein in a case of selecting the sheet size to be used in forming images in the image formation apparatus and the other image formation apparatus, the sheet size held by the image formation apparatus is previously selected on the basis of the selection according to said second selection means even in a case where the sheet size selected by said first selection means is not held by the image formation apparatus and is held by the other image formation apparatus.

10. An image formation system which includes an image formation apparatus for forming an image which was read and another image formation apparatus capable of communicating with the image formation apparatus through a communication medium, wherein the image formation apparatus comprises:

first selection means for selecting a sheet of which size corresponds to an attribute of the image; and second selection means for selecting a sheet other than the sheet of which size is selected by said first selection means as a sheet to be used in forming an image by the image formation apparatus, wherein in a case of forming images in the image formation apparatus and the other image formation apparatus, the sheet size held by the image formation apparatus is previously selected on the basis of the selection according to said second selection means even in a case where the sheet size selected by said first selection means is not held by the image formation apparatus and is held by the other image formation apparatus.

11. An image formation system which has a local copying apparatus having a first scanner unit for reading an original image, a first printer unit for printing the original image, and a first sheet feed stage for feeding sheets used in printing performed by the first printer unit, and a remote copying apparatus having a second scanner unit for reading the original image, a second printer unit for printing the original image, and a second sheet feed stage for feeding sheets used in printing performed by the second printer unit, wherein the image formation system can print the original image by the second printer unit by transmitting the original image which was read by the first scanner unit from the local copying apparatus to the remote copying apparatus through a predetermined network, wherein the local copying apparatus comprises:

first selection means for detecting a size of the original image to be read by the first scanner unit and selecting a sheet size to be used in printing the original image on the basis of the detected size;

detection means for detecting whether or not sheets of which size was selected by said first selection means are stored in the first sheet feed stage;

second selection means for selecting a sheet size other than the sheet size selected by said first selection means as the sheet size to be used in printing the original image by the first printer unit, in a case where it was detected that the sheets are not stored in the first sheet feed stage by said detection means; and notification means for notifying the sheet size selected by said second selection means to the remote copying apparatus, wherein the remote copying apparatus comprises:

control means for controlling the second printer unit to print the original image received from the local copying apparatus using the sheets of which size was notified by said notification means which are stored in the second sheet feed stage.

12. A control method of an image formation system which includes an image formation apparatus for forming an image which was read and another image formation apparatus capable of communicating with the image formation apparatus through a communication medium, said method comprising:

a first selection step of selecting a sheet of which size corresponds to an attribute of the image;

a first detection step of detecting whether or not the image formation apparatus has the sheet selected in said first selection step; and a second selection step of selecting a sheet other than the sheet of which size is selected in said first selection step as a sheet to be used in forming an image by the image formation apparatus in a case where it was detected that the image formation apparatus does not have the sheet in said first detection step; and a control step of controlling the other image formation apparatus to perform an image formation using the sheet selected in said second selection step.

13. A method according to claim 12, wherein said first selection step detects an original size read by the image formation apparatus and selects the sheet on the basis of the original size and a designated magnification.

14. A method according to claim 12, wherein said second selection step selects the sheet other than the sheet of which size was selected in said first selection step on the basis of setting of a user.

15. A method according to claim 12, further comprising first notification step of notifying selection information according to said first selection step and said second selection step to the other image formation apparatus.

16. A method according to claim 15, further comprising a second detection step of detecting whether or not the other image formation apparatus has a sheet of which size was notified in said first notification step.

17. A method according to claim 16, further comprising a second notification step of notifying, in a case where it was detected that the sheet was not held in said second detection step, that fact to the image formation apparatus and the other image formation apparatus.

18. A method according to claim 17, wherein said control step controls to perform an image formation using a predetermined sheet of which size was previously set in the other image formation apparatus, in a case where it was detected that the sheet was not held in said second detection step.

19. A method according to claim 18, wherein said control step controls not to perform the image formation to terminate processing to be executed in the other image formation apparatus, in a case where it was detected that the sheet was not held in said second detection step.

20. A method according to claim 12, wherein in case of selecting the sheet size to be used in forming images in the image formation apparatus and the other image formation apparatus, the sheet size held by the image formation apparatus is previously selected on the basis of the selection according to said second selection step even in a case where the sheet size selected in said first selection step is not held by the image formation apparatus and is held by the other image formation apparatus.

21. A control method of an image formation system which includes an image formation apparatus for forming an image which was read and another image formation apparatus capable of communicating with the image formation apparatus through a communication medium, said method comprising:

a first selection step of selecting a sheet of which size corresponds to an attribute of the image; and a second selection step of selecting a sheet other than the sheet of which size is selected in said first selection step as a sheet to be used in forming an image by the image formation apparatus, wherein in case of forming images by the image formation apparatus and the other image formation apparatus, the sheet size held by the image formation apparatus is previously selected on the basis of the selection according to said second selection step even in a case where the sheet size selected in said first selection step is not held by the image formation apparatus and is held by the other image formation apparatus.

22. A control method of an image formation system which has a local copying apparatus having a first scanner unit for reading an original image, a first printer unit for printing the original image, and a first sheet feed stage for feeding sheets used in printing performed by the first printer unit, and a remote copying apparatus having a second scanner unit for reading the original image, a second printer unit for printing the original image, and a second sheet feed stage for feeding sheets used in printing performed by the second printer unit, wherein the control method can print the original image by the second printer unit by transmitting the original image which was read by the first scanner unit from the local copying apparatus to the remote copying apparatus through a predetermined network, said method comprising:

a first selection step of detecting a size of the original image to be read by the first scanner unit and selecting a sheet size to be used in printing the original image on the basis of the detected size;

a detection step of detecting whether or not sheets of which size was selected in said first selection step are stored in the first sheet feed stage;

a second selection step of selecting a sheet size other than the sheet size selected in said first selection step as sheet size to be used in printing the original image by the first printer unit, in a case where it was detected that the sheets are not stored in the first sheet feed stage in said detection step;

a notification step of notifying the sheet size selected in said second selection step to the remote copying apparatus; and a control step of controlling the second printer unit to print the original image received from the local copying apparatus using the sheets of which size was notified in said notification step which are stored in the second sheet feed stage.

23. An image formation apparatus for forming an image which was read and which can communicate with another image formation apparatus through a communication medium, said image formation apparatus comprising:

first selection means for selecting a sheet of which size corresponds to an attribute of the image;

detection means for detecting whether or not the image formation apparatus has the sheet selected by said first selection means;

second selection means for selecting a sheet other than the sheet of which size is selected by said first selection means as a sheet to be used in forming an image by the image formation apparatus in a case where it was detected that the image formation apparatus does not have the sheet by said detection means; and notification means for notifying selection information according to said first selection means and said second selection means to the other image formation apparatus.

24. An image formation apparatus for forming an image which was read by another image formation apparatus and which can communicate with the other image formation apparatus through a communication medium, said image formation apparatus comprising:

detection means for receiving, in a case where the other image formation apparatus does not have a sheet of which size corresponds to an attribute of the image, a notification of selection information including a fact that another sized sheet other than the sheet of which size corresponds to the attribute of the image was selected as a sheet to be used to form the image by the other image formation apparatus and detecting whether or not the image formation apparatus has the notified other sized sheet; and control means for controlling an image formation of the image in accordance with a detection result obtained by said detection means.

25. A local copying apparatus, which has a first scanner unit for reading an original image, a first printer unit for printing the original image, and a first sheet feed stage for feeding sheets used in printing performed by the first printer unit, wherein the local copying apparatus is connected to a remote copying apparatus, which has a second scanner unit for reading the original image, a second printer unit for printing the original image, and a second sheet feed stage for feeding sheets used in printing performed by the second printer unit, through a predetermined network, wherein the original image read by the first scanner unit is transmitted to the remote copying apparatus through the predetermined network, and the original image can be printed by the second printer unit, said local copying apparatus comprising:

first selection means for detecting a size of the original image to be read by the first scanner unit and selecting a sheet size to be used in printing the original image on the basis of the detected size;

detection means for detecting whether or not sheets of which size was selected by said first selection means are stored in the first sheet feed stage;

second selection means for selecting sheet size other than the sheet size selected by said first selection means as sheet size to be used in printing the original image by the first printer unit, in a case where it was detected that the sheets are not stored in the first sheet feed stage by said detection means; and notification means for notifying the sheet size selected by said second selection means to the remote copying apparatus.

26. A remote copying apparatus, which has a second scanner unit for reading an original image, a second printer unit for printing the original image, and a second sheet feed stage for feeding sheets used in printing performed by the second printer unit, wherein the remote copying apparatus is connected to a local copying apparatus, which has a first scanner unit for reading the original image, a first printer unit for printing the original image, and a first sheet feed stage for feeding sheets used in printing performed by the first printer unit, through a predetermined network, wherein the original image read by the first scanner unit is received from the local copying apparatus through the predetermined network, and the original image can be printed by the second printer unit, said remote copying apparatus comprising:

detection means for receiving, in a case where sheets of which size was selected on the basis of a size of the original image for the printing of the original image are not stored in the first sheet feed stage in the local copying apparatus, a notification of selection information including a fact that another sized sheet other than the sheet selected on the basis of the size of the original image was selected as the sheet size to be used in printing the original image by the first printer unit, and detecting whether or not the remote copying apparatus has the notified other sized sheet; and control means for controlling the second printer unit to print the original image received from the local copying apparatus by using a sheet of which size corresponds to size of sheets stored in the second sheet feed stage in accordance with a detection result obtained by said detection means.

27. A computer-readable storage medium which stores program codes for executing a control method of an image formation system which includes an image formation apparatus for forming an image which was read and another image formation apparatus capable of communicating with the image formation apparatus through a communication medium, the program codes comprising:

a first selection code for selecting a sheet of which size corresponds to an attribute of the image;

a first detection code for detecting whether or not the image formation apparatus has the sheet selected by said first selection code;

a second selection code for selecting a sheet other than the sheet of which size is selected by said first selection code as the sheet to be used in forming the image by the image formation apparatus in a case where it was detected that the image formation apparatus does not have the sheet by said first detection code; and a control code for controlling the other image formation apparatus to perform an image formation using the sheet selected by said second selection code.

28. A computer-readable storage medium which stores program codes for executing a control method of an image formation system which includes an image formation apparatus for forming an image which was read and another image formation apparatus capable of communicating with the image formation apparatus through a communication medium, the program codes comprising:

a first selection code for selecting a sheet of which size corresponds to an attribute of the image; and a second selection code for selecting a sheet other than the sheet of which size is selected by said first selection code as the sheet to be used in forming the image by the image formation apparatus, wherein in case of forming images by the image formation apparatus and the other image formation apparatus, the sheet size held by the image formation apparatus is previously selected on the basis of the selection according to said second selection code even in a case where the sheet size selected by said first selection code is not held by the image formation apparatus and is held by the other image formation apparatus.

29. A computer-readable storage medium which stores program codes for executing a control method of an image formation system which has a local copying apparatus having a first scanner unit for reading an original image, a first printer unit for printing the original image, and a first sheet feed stage for feeding sheets used in printing performed by the first printer unit, and a remote copying apparatus having a second scanner unit for reading the original image, a second printer unit for printing the original image, and a second sheet feed stage for feeding sheets used in printing performed by the second printer unit, wherein the image formation system can print the original image by the second printer unit by transmitting the original image which was read by the first scanner unit from the local copying apparatus to the remote copying apparatus through a predetermined network, the program codes comprising:

a first selection code for detecting a size of the original image to be read by the first scanner unit and selecting a sheet size to be used in printing the original image on the basis of the detected size;

a detection code for detecting whether or not sheets of which size was selected by said first selection code are stored in the first sheet feed stage;

a second selection code for selecting a sheet size other than the sheet size selected by said first selection code as the sheet size to be used in printing the original image by the first printer unit, in a case where it was detected that the sheets are not stored in the first sheet feed stage by said detection code;

a notification code for notifying the sheet size selected by said second selection code to the remote copying apparatus; and a control code for controlling the second printer unit to print the original image received from the local copying apparatus using the sheets of which size was notified by said notification code which are stored in the second sheet feed stage.

* * * * *